(12) United States Patent
Villalon, Jr. et al.

(10) Patent No.: US 12,540,413 B2
(45) Date of Patent: *Feb. 3, 2026

(54) SYSTEMS AND METHODS FOR RECOVERY OF MOLTEN METAL

(71) Applicant: Phoenix Tailings, Inc., Woburn, MA (US)

(72) Inventors: Thomas Anthony Villalon, Jr., Boston, MA (US); Benjamin David Brakenwagen, Narragansett, RI (US); Richard Robert Salvucci, Quincy, MA (US)

(73) Assignee: Phoenix Tailings, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,216

(22) Filed: Mar. 4, 2024

(65) Prior Publication Data

US 2025/0075358 A1    Mar. 6, 2025

Related U.S. Application Data (60) Continuation of application No. 18/363,257, filed on Aug. 1, 2023, now Pat. No. 11,952,674, which is a
(Continued)

(51) Int. Cl.
| | | |
|---|---|---|
| *C25C 5/00* | (2006.01) | |
| *C25C 3/34* | (2006.01) | |
| *C25C 7/00* | (2006.01) | |

(52) U.S. Cl.
CPC .................... *C25C 3/34* (2013.01)

(58) Field of Classification Search
CPC ........................................... C25C 3/34
See application file for complete search history.

(56) References Cited

U.S. PATENT DOCUMENTS

| | | | |
|---|---|---|---|
| 1,944,733 | A | 1/1934 | Doerschuk et al. |
| 2,552,876 | A | 5/1951 | Tama |
| (Continued) | | | |

FOREIGN PATENT DOCUMENTS

| | | |
|---|---|---|
| CN | 2471796 Y | 1/2002 |
| CN | 2853814 Y | 1/2007 |
| (Continued) | | |

OTHER PUBLICATIONS

International Search Report and Written Opinion for International Application No. PCT/US2023/013821 dated Apr. 28, 2023.
(Continued)

*Primary Examiner* — Zulmariam Mendez
(74) *Attorney, Agent, or Firm* — Wolf, Greenfield & Sacks, P.C.

(57) ABSTRACT

Systems and methods for recovery of molten metal are generally described. Certain systems comprise a reactor (e.g., a reduction cell such as an electrolytic cell comprising an anode, a cathode, and an electrolyte) comprising molten metal within a container; and a collection vessel at least partially contained within the container of the reactor, the collection vessel comprising an opening fluidically connected to the container of the reactor. Some systems comprise a reactor; and a collection vessel comprising a first opening fluidically connected to the reactor and a second opening fluidically connected to a source of gas (e.g., inert gas) and to a source of negative pressure.

30 Claims, 8 Drawing Sheets

Related U.S. Application Data division of application No. 18/174,330, filed on Feb. 24, 2023, now Pat. No. 11,952,673.

(60) Provisional application No. 63/334,371, filed on Apr. 25, 2022.

(56) References Cited

U.S. PATENT DOCUMENTS

| | | |
|---|---|---|
| 3,402,921 A | 9/1968 | Hart |
| 4,551,218 A | 11/1985 | Gesing et al. |
| 4,747,924 A * | 5/1988 | Itoh .................... C25C 3/34 |
| | | 204/292 |
| 4,783,245 A | 11/1988 | Nakamura et al. |
| 4,880,506 A * | 11/1989 | Ackerman ............ C25C 3/34 |
| | | 205/47 |
| 5,914,440 A | 6/1999 | Celik et al. |
| 11,952,673 B2 | 4/2024 | Villalon, Jr. et al. |
| 11,952,674 B2 | 4/2024 | Villalon, Jr. et al. |
| 2011/0139267 A1 | 6/2011 | Gagnon |
| 2017/0122665 A1 | 5/2017 | Walkenhorst et al. |

FOREIGN PATENT DOCUMENTS

| | | |
|---|---|---|
| CN | 201883158 U | 6/2011 |
| CN | 102465210 A | 5/2012 |
| CN | 103436920 A | 12/2013 |
| CN | 105369293 A | 3/2016 |
| CN | 111962102 A | 11/2020 |
| CN | 111962102 B | 6/2021 |

OTHER PUBLICATIONS

International Preliminary Report on Patentability (Chapter 1) for International Application No. PCT/US2023/013821 dated Nov. 7, 2024.

Office Action for U.S. Appl. No. 18/174,330 dated Aug. 31, 2023.

* cited by examiner

SYSTEMS AND METHODS FOR RECOVERY OF MOLTEN METAL

RELATED APPLICATIONS

This application is a continuation of U.S. patent application Ser. No. 18/363,257, filed Aug. 1, 2023, and entitled "Systems and Methods for Recovery of Molten Metal," which is a division of U.S. patent application Ser. No. 18/174,330, filed Feb. 24, 2023, and entitled "Systems and Methods for Recovery of Molten Metal," which claims priority under 35 U.S.C. § 119(e) to U.S. Provisional Patent Application No. 63/334,371, filed Apr. 25, 2022, and entitled "Systems and Methods for Recovery of Molten Metal," each of which is incorporated herein by reference in its entirety for all purposes.

GOVERNMENT SPONSORSHIP

This invention was made with government support under Contract No. DE-AR0001500 awarded by the Advanced Research Projects Agency-Energy (ARPA-E). The government has certain rights in the invention.

TECHNICAL FIELD

Systems and methods for the recovery of molten metal are generally described.

SUMMARY

The present disclosure is directed to systems and methods for the recovery of molten metal. Certain aspects are related to the removal of molten metal from reactors such as reduction cells (e.g., electrolytic cells). The subject matter of the present disclosure involves, in some cases, interrelated products, alternative solutions to a particular problem, and/or a plurality of different uses of one or more systems and/or articles.

Certain aspects are related to systems.

In some embodiments, the system comprises a reactor comprising molten metal within a container; and a collection vessel at least partially contained within the container of the reactor, the collection vessel comprising an opening fluidically connected to the container of the reactor.

In some embodiments, the system comprises a reactor; and a collection vessel, wherein the collection vessel is fluidically connected to the reactor, a source of gas, and a source of negative pressure.

In certain embodiments, the system comprises a reactor; and a collection vessel comprising: a first opening fluidically connected to the reactor, and a second opening fluidically connected to a source of gas and to a source of negative pressure.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Reactors, such as electrolytic cells, can be used to prepare metal materials, such as rare earth metal materials. For example, oxides of rare earth metals with relatively low melting points (e.g., lanthanum, cerium, praseodymium, and neodymium) can be converted to halides (e.g., chlorides, fluorides, etc.) and then reduced within an electrolytic cell to produce halide gas at the anode of the electrolytic cell and liquid metal at the cathode of the electrolytic cell. Other processes can also be used.

Extracting the metal from an electrolytic cell or other types of reduction cells or reactors in pure or substantially pure form has traditionally been very challenging. Current commercial practices utilize a ladle to extract rare earth elements from within the furnace cell. This practice is wasteful, however, due to losses attributable to spilling and the introduction of the molten metal to both the molten salt electrolyte and oxygen. Both the electrolyte and the oxygen introduce impurities within the rare earth material, resulting in less production and lower quality metals. Similar challenges exist when attempting to extract molten metals from other types of reduction cells and other types of reactors, for example, reactors in which the molten metal is present along with another phase (e.g., water, a molten oxide, etc.). Certain inventive embodiments described herein are related to systems and methods for extracting metal (e.g., liquid rare earth metal(s)) from electrolytic cells or other types of reduction cells or reactors while maintaining high purity. This can be achieved, in accordance with certain embodiments, by extracting the molten metal from the reactor while reducing or eliminating exposure of the molten metal to oxygen (e.g., via air) and/or by reducing or eliminating exposure of the molten metal to a second phase present within the reactor (e.g., the electrolyte of an electrolytic cell).

Figure 1A:
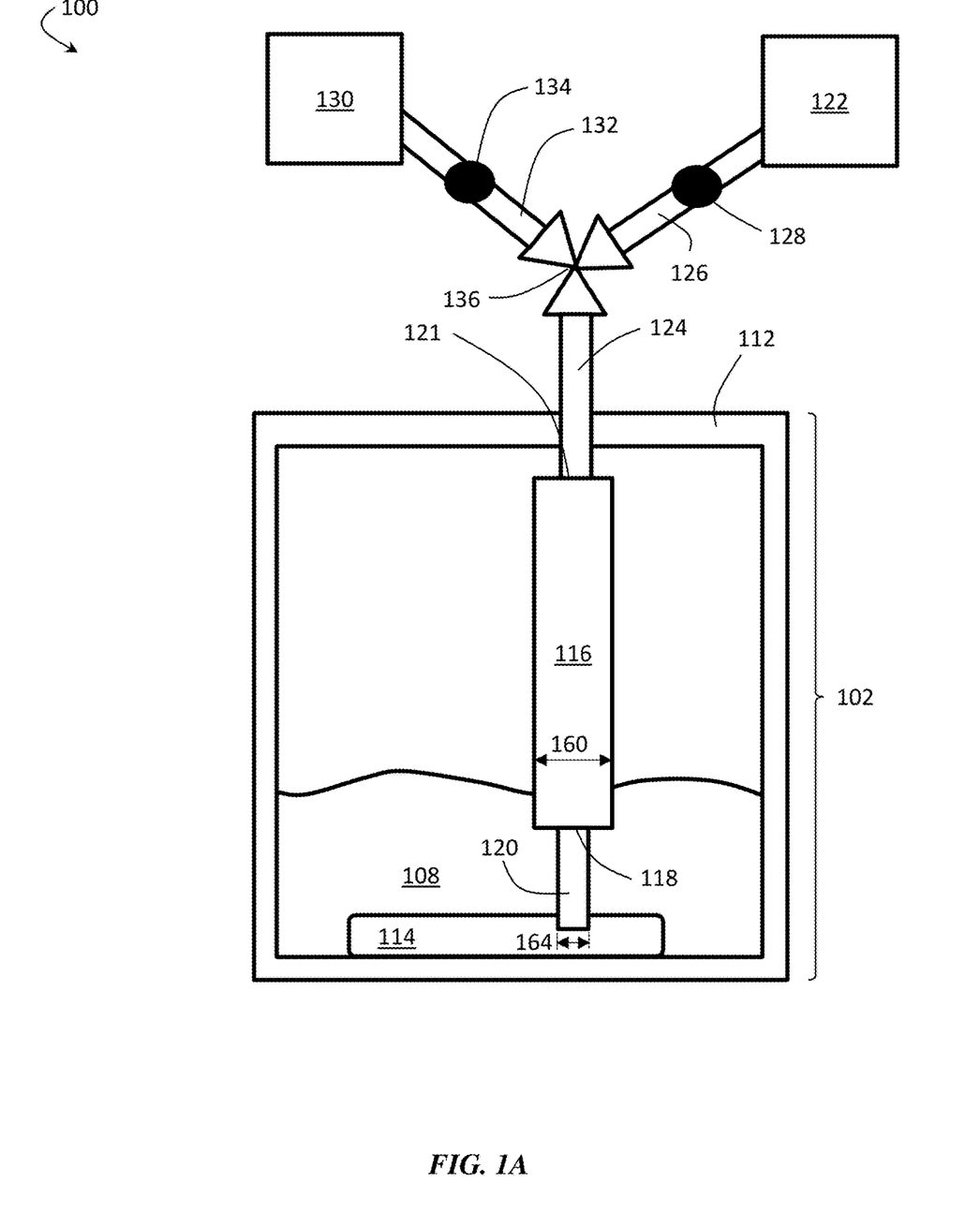
FIGS. 1A-1C are cross-sectional schematic illustrations of systems for producing and extracting molten metal, according to certain embodiments.
Figure 1B:
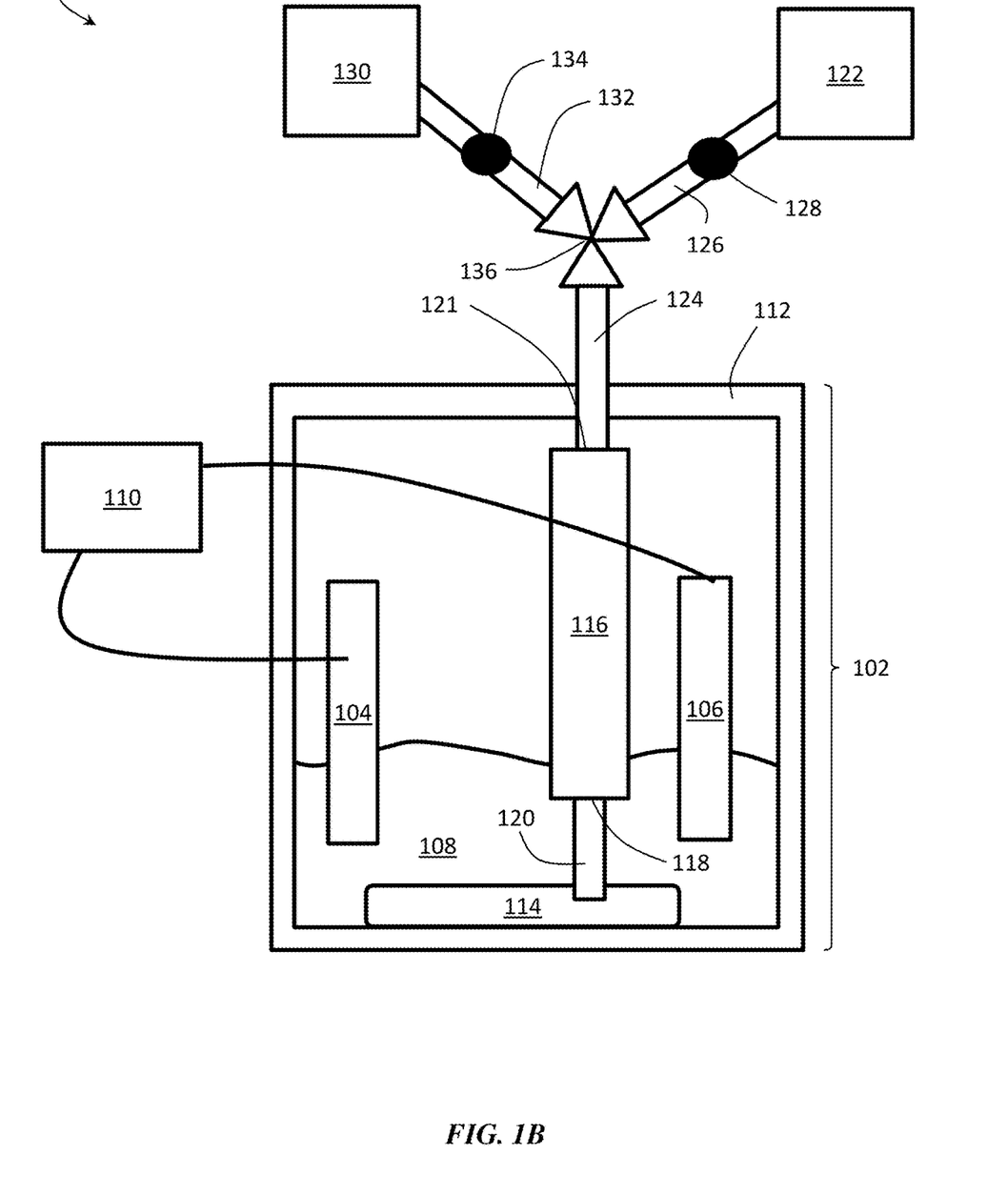

As noted above, certain aspects are related to systems. The systems can be used to produce metals (e.g., relatively high purity metals), such as rare earth metals. FIGS. 1A-1B are cross sectional schematic illustrations of examples of such systems (system 100).

In certain embodiments, the system comprises a reactor. Any of a variety of reactors can be used. In some embodiments, the reactor produces one or more molten metals as a reaction product. The reaction that is performed within the reactor can be spontaneous or non-spontaneous. One example of such a system is shown in FIG. 1A. In FIG. 1A, system 100 comprises reactor 102. In FIG. 1A, reactor 102 comprises molten metal 114. In some embodiments, reactor 102 comprises a second liquid phase. For example, in FIG. 1A, reactor 102 comprises second liquid phase 108. The second liquid phase can comprise, in some embodiments, a reactant and/or a reaction product of the reaction within the reactor.

In some embodiments, the reactor is a reduction cell. The term "reduction cell," as used herein, refers to any cell within which a reduction reaction is used to produce a reaction product. In some embodiments, the reduction cell is used to produce molten metal (e.g., one or more molten rare earth metals). In certain embodiments, the reduction cell is used to perform a metallothermic process. Reduction cells can be used to perform spontaneous or non-spontaneous chemical reactions to produce the product. In certain embodiments, the reduction cell produces one or more molten metals (e.g., one or more molten rare earth metals) that is present within the reduction cell along with a second phase (e.g., a second liquid phase). The second liquid phase can be, for example, water, molten ceramic, or another type of liquid. Referring to FIG. 1A to illustrate, in some embodiments, reactor 102 is a reduction cell within which molten metal 114 and second phase 108 are contained.

In some embodiments, the reduction cell is an electrolytic cell. The term "electrolytic cell," as used herein, refers to a device in which electrical energy is input into the device to drive a non-spontaneous redox reaction. The electrolytic cell can comprise, in accordance with certain embodiments, an anode, a cathode, and an electrolyte. Referring to FIG. 1B, for example, system 100 comprises a reduction cell 102 which is an electrolytic cell. In FIG. 1B, second phase 108 is an electrolyte, and the electrolytic cell comprises anode 104 and cathode 106. Typically, operation of the electrolytic cell proceeds as follows. A source of electrical energy (e.g., source 110 in FIG. 1B) can be connected to the anode and the cathode, and electrical energy from the source can be used to drive a nonspontaneous redox reaction between the anode and the cathode. The source of electrical energy (e.g., an AC power source, a battery, or any other suitable source) can be used to generate a potential difference between the anode and the cathode that forces electrons to flow from the anode to the cathode, which drives the nonspontaneous redox reaction. At the anode, an oxidation half reaction generally occurs, whereas at the cathode, a reduction half-reaction generally occurs. The electrolyte is generally used to facilitate the transport of ions between the anode and the cathode, which balances the charges within the cell as electrons are transported between the anode and the cathode.

A variety of types of materials can be used as the anode, the cathode, and the electrolyte of the electrolytic cell, and the selection of these materials generally depends on the type of redox reaction that is being driven by the electrolytic cell. Examples of materials from which the anode and/or the cathode can be made include, but are not limited to, carbon (e.g., graphitic carbon such as graphene, graphite, carbon nanotubes, and the like); metal (e.g., copper, silver, zinc, and the like); and conducting ceramics and/or cermets (e.g., yttria-stabilized zirconia (YSZ), lanthanum strontium manganite (LSM), Gd-doped ceria, and borides such as $TiB_2$ and other diborides). Examples of materials from which the electrolyte can be made include, but are not limited to, aqueous and non-aqueous solutions; molten salts; and the like.

The reactor can comprise, in accordance with certain embodiments, a container. In FIGS. 1A-1B, for example, reactor 102 comprises container 112. The container can contain, in some embodiments (such as certain embodiments in which the reactor is an electrolytic cell), an anode, a cathode, and an electrolyte. The container may also contain other components of the system, as described in more detail below. The container can have any of a variety of suitable sizes. In some embodiments, the container has an interior volume of at least 500 $cm^3$; at least 1000 $cm^3$; at least 10,000 $cm^3$; at least 100,000 $cm^3$; at least 1 $m^3$; or at least 10 $m^3$ (and/or up to 100 $m^3$; up to 1000 $m^3$; up to 10,000 $m^3$; or greater).

Figure 2:
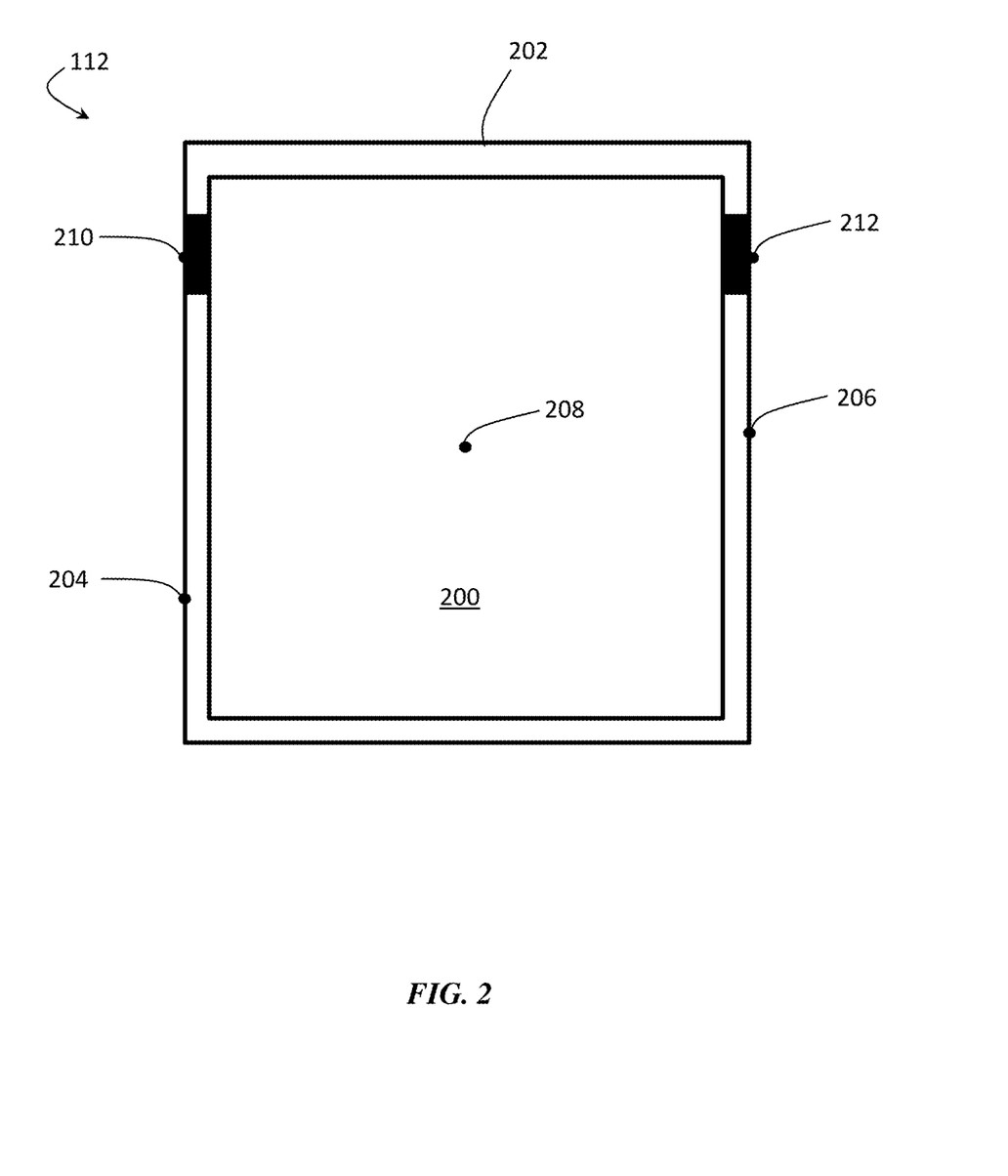
FIG. 2 is, in accordance with some embodiments, a container of a reactor.

The container of the reactor can, in certain embodiments, be thermally insulated. The use of a thermally insulated container can be particularly useful when high temperature operation (which can be useful when processing or otherwise handling molten salts, molten metals, and similar types of materials) is desired. In some embodiments, the interior of the container is substantially surrounded (e.g., at least 50% surrounded, at least 70% surrounded, at least 80% surrounded, at least 90% surrounded, at least 98% surrounded, or 100% surrounded) by thermally insulating solid material. The thermally insulating solid material can have, for example, a thermal conductivity of less than or equal to 10 W/mK at 25° C., less than or equal to 1 W/mK at 25° C., or less than or equal to 0.1 W/mK at 25° C. To determine whether the interior of a container is "at least 50% surrounded" by thermally insulating solid material, one would: (1) locate the geometric center of the interior of the container; (2) for each location on the outer boundary of the container, establish a straight line from the geometric center of the interior of the container to that location on the outer boundary of the container; and (3) calculate the percentage of the straight lines that pass through thermally insulating solid material. If the result of Step 3 is at least 50%, then the interior of the container would be said to be at least 50% surrounded by thermally insulating solid material. A similar calculation can be performed to determine whether a container is surrounded by thermally insulating solid material to any other degree (e.g., at least 70% surrounded by, at least 80% surrounded by, etc.). One example of this calculation can be described in relation to FIG. 2. In FIG. 2, container 112 is made of both thermally insulating material (shown in white in the figure) and thermally conducting material (shown in black in the figure). Interior 200 of container 112 in FIG. 2 is at least 50% surrounded by thermally insulating solid material because 50% or more of the locations on the outer boundary 202 of container 112 (including locations 204 and 206) have thermally insulating solid material positioned between those locations and geometric center 208 of container 112. (In contrast, locations 210 and 212 do not have thermally insulating solid material positioned between them and geometric center 208 of container 112.)

Examples of thermally insulating solid materials that can be used to make at least a portion of (e.g., at least 50 vol % of, at least 75 vol % of, at least 90 vol % of, at least 95 vol % of, at least 99 vol % of, or more of) the container of the reactor include, but are not limited to, metal oxides, metal nitrides, metalloid oxides, and metalloid nitrides. Specific examples of thermally insulating solid materials that can be used to make at least a portion of (e.g., at least 50 vol % of, at least 75 vol % of, at least 90 vol % of, at least 95 vol % of, at least 99 vol % of, or more of) the container of the reactor include, but are not limited to, concrete, glasses, ceramics, and/or cermets.

As noted above, in some embodiments, the reactor can be operated at a relatively high temperature. For example, in some embodiments, the spatially averaged temperature within the container of the reactor is at least 30° C., at least 50° C., at least 100° C., at least 200° C., at least 400° C., at least 600° C., at least 800° C., at least 1000° C., at least 1500° C., at least 2000° C., at least 3000° C., and/or less than or equal to 4000° C., or less than or equal to 3500° C. Combinations of these ranges are also possible. As one specific example, in some embodiments, the reactor is operated at around 30° C., for example, for the recovery of gallium. As another example, in some embodiments, the reactor is operated at around 3422° C., for example, for the recovery of tungsten.

In certain embodiments, the reactor contains molten metal, for example, within the container of the reactor. As shown in FIGS. 1A-1B, for example, container 112 of reactor 102 contains molten metal 114. In some embodiments, the reactor contains molten rare earth metal(s), for example, within the container of the reactor. Examples of molten metals that can be contained within the reactor include, but are not limited to, lanthanum, cerium, praseodymium, neodymium, promethium, samarium, europium, gadolinium, terbium, dysprosium, holmium, erbium, thulium, ytterbium, and/or lutetium. In some embodiments, the reactor contains molten refractory metal(s) (e.g., titanium, zirconium, hafnium, vanadium, niobium, tantalum, chromium, molybdenum, tungsten, rhenium, ruthenium, osmium, rhodium, and/or iridium)) within the container of the reactor. In some embodiments, the reactor contains molten metal(s) of one or more Group 13 elements (aluminum, gallium, indium, thallium, and/or nihonium) within the container of the reactor. The molten metal that is contained within the reactor can be, for example, a product of the reduction reaction (e.g., as part of a redox reaction mechanism or other mechanism involving a reduction reaction) the reactor is configured to carry out.

The system can include, in some embodiments, a collection vessel. In FIGS. 1A-1B, for example, system 100 comprises collection vessel 116. The collection vessel can be used to collect molten metal from the container of the reactor. Accordingly, in some embodiments, the collection vessel comprises an opening (e.g., an inlet) fluidically connected to the container of the reactor. In FIGS. 1A-1B, collection vessel 116 comprises first opening 118. The opening of the collection vessel may, in some embodiments, be configured such that fluid communication is established between the container of the vessel and the collection vessel. For example, in FIGS. 1A-1B, first opening 118 can be used as an inlet through which molten metal 114 can be transported via conduit 120 (e.g., a siphon tube). In some embodiments, conduit 120 has an internal diameter of at least 0.25 inches (and/or, in some embodiments, at least 1 inch, or at least 2 inches).

Generally, the term "opening" is used herein to refer to any opening within an object, and openings can be used as inlets, as outlets, or both.

As used herein, two elements are in "fluidic communication" with each other (or, equivalently, in fluid communication with each other) when fluid may be transported from one of the elements to the other of the elements without otherwise altering the configurations of the elements or a configuration of an element between them (such as a valve). Two conduits connected by an open valve (thus allowing for the flow of fluid between the two conduits) are considered to be in fluidic communication with each other. In contrast, two conduits separated by a closed valve (thus preventing the flow of fluid between the conduits) are not considered to be in fluidic communication with each other.

As used herein, two elements are "fluidically connected" to each other when they are connected such that, under at least one configuration of the elements and any intervening elements, the two elements are in fluidic communication with each other. Two conduits connected by a valve that permits flow between the two conduits in at least one configuration of the valve would be said to be fluidically connected to each other. To further illustrate, two conduits that are connected by a valve that permits flow between the conduits in a first valve configuration but not a second valve configuration are considered to be fluidically connected to each other both when the valve is in the first configuration and when the valve is in the second configuration. In contrast, two fluidic conduits that are not connected to each other (e.g., by a valve, another conduit, or another component) in a way that would permit fluid to be transported between them under any configuration would not be said to be fluidically connected to each other. Elements that are in fluidic communication with each other are always fluidically connected to each other, but not all elements that are fluidically connected to each other are necessarily in fluidic communication with each other.

Figure 1C:
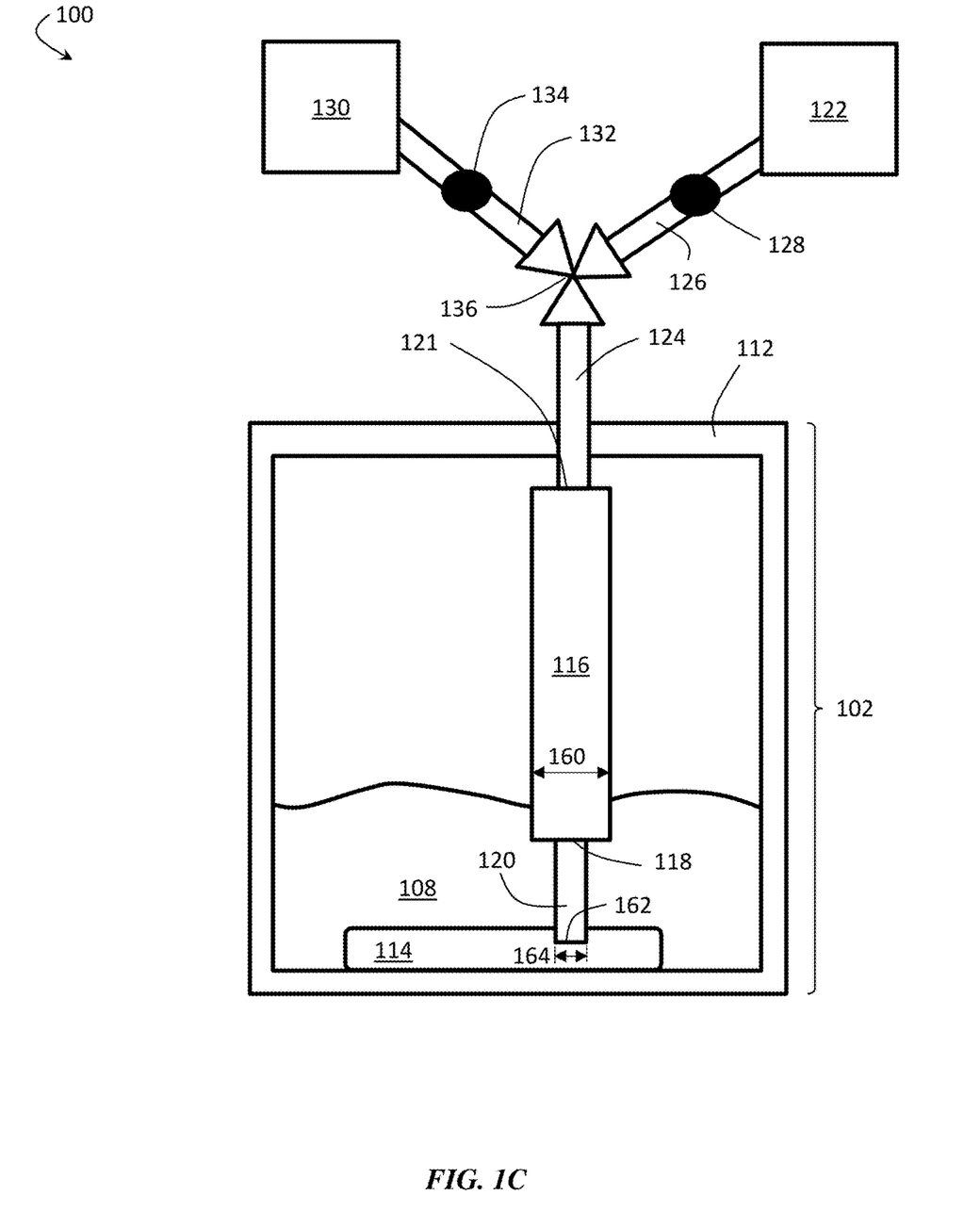

In certain embodiments, the collection vessel can have a relatively large maximum interior cross-sectional dimension relative to the maximum cross-sectional dimension of the opening of the conduit that is in contact with the molten metal. In this context, the maximum interior cross-sectional dimension of the collection vessel is the largest dimension of the interior of the collection vessel that is perpendicular to the direction in which molten metal flows through the collection vessel during operation. Similarly, the maximum cross-sectional dimension of the opening that is in contact with the molten metal is the largest dimension of that opening that is perpendicular to the direction in which molten metal flows through that opening during operation. Referring to FIG. 1C, for example, collection vessel 116 has a larger maximum interior cross-sectional dimension (shown as dimension 160 in FIG. 1C) than the maximum cross-sectional dimension of opening 162 (with the maximum cross-sectional dimension of opening 162 shown as dimension 164 in FIG. 1C). In some embodiments, the maximum interior cross-sectional dimension of the collection vessel is at least 1.1 times, at least 1.2 times, at least 1.5 times, at least 2 times, at least 5 times, at least 10 times, or at least 100 times (and/or less than or equal to 10,000 times) the maximum cross-sectional dimension of the opening of the conduit that is in contact with the molten metal.

The collection vessel can be, in certain embodiments, at least partially contained within the container of the reactor (e.g., during at least 25%, at least 50%, at least 75%, at least 90%, or all of the time that metal is transported into the collection vessel). In some embodiments, a relatively large percentage (e.g. at least 50%, at least 75%, at least 90%, at least 95%, or all) of the interior volume of the collection vessel can be contained within the container of the reactor. As shown in FIGS. 1A-1B, 100% of collection vessel 116 is contained within container 112 of reactor 102. In accordance with certain embodiments, locating the collection vessel at least partially (or completely) within the container of the reactor can allow one to collect molten metal from the container of the reactor while maintaining the molten metal above its melting point. As described in more detail below, certain strategies can be employed to minimize the contact between the molten metal and a second phase within the reactor (e.g., the electrolyte of the electrolytic cell) and with oxygen (e.g., via air) while the metal is transported from a location within the reactor and outside the collection vessel to a location within the reactor and within the collection vessel.

In certain embodiments, the collection vessel is in contact with the second phase (e.g., the electrolyte). The collection vessel can be in contact with the second phase, for example, during at least 25%, at least 50%, at least 75%, at least 90%, or all of the time that metal is transported into the collection vessel. As illustrated in FIGS. 1A-1B, for example, collection vessel 116 is in contact with second phase 108. In some instances, establishing contact between the collection vessel and the second phase (e.g., the electrolyte) can enhance the degree to which heat is maintained within the system, making collection of the metal more efficient. It should be understood, however, that contact between the collection vessel and the second phase is not necessarily required, and in other embodiments, the collection vessel and the second phase are not in contact with each other.

The collection vessel can have any of a variety of suitable sizes. In some embodiments, a relatively large collection vessel can be used. For example, in certain embodiments, the collection vessel has an interior volume of at least 180 cm$^3$, at least 250 cm$^3$, at least 500 cm$^3$, or at least 1000 cm$^3$ (and/or up to 10,000 cm$^3$; up to 100,000 cm$^3$; up to 1 m$^3$; or more).

The collection vessel can be made of any of a variety of suitable materials. In some embodiments, the collection vessel can be made of a material configured to withstand the high temperature environment of the container of certain reactors. For example, in some embodiments, walls of the collection vessel comprise a refractory metal and/or a ceramic. In some embodiments, at least a portion (e.g., at least 50% of, at least 75% of, at least 90% of, at least 95% of, at least 99% of, or all) of the interior surface area of the walls of the collection vessel can be made of tantalum, tungsten, titanium, molybdenum, high-grade iron, Hastelloy B, and/or Inconel. In certain embodiments, the use of tantalum can be advantageous as it can provide a combination of weldability and high temperature resistance. In some embodiments in which the reactor is being used to process ferroalloys, the use of high-grade iron for the collection vessel can be advantageous.

In some embodiments, the collection vessel comprises an opening fluidically connected to a source of negative pressure. As shown in FIGS. 1A-1B, for example, collection vessel 116 comprises opening 121, which is fluidically connected to negative pressure source 122 via conduits 124 and 126. Any of a variety of sources of negative pressure can be used. For example, in some embodiments, the source of the negative pressure is a vacuum pump. In some embodiments, the system comprises a regulator (e.g., between the negative pressure source and the collection vessel, such as in position 128 of FIGS. 1A-1B) that is configured to control the degree of negative pressure applied by the negative pressure source to the collection vessel. As one example, the regulator can be a vacuum regulator configured to control the degree to which a vacuum pump applies negative pressure to the collection vessel (and, accordingly, the rate with which molten metal is drawn into the collection vessel, as described below). In some embodiments, the recovery of liquid metal can be achieved by applying a vacuum of 50 inHg or less, 25 inHg or less, 10 inHg or less, or less.

In certain embodiments, the collection vessel comprises an opening fluidically connected to a source of a gas (e.g., a tank or other container containing pressurized gas). The gas can be, in some embodiments, an inert gas with respect to the molten metal within the reactor. As shown in FIGS. 1A-1B, for example, collection vessel 116 is fluidically connected to gas source 130 (e.g., a source of an inert gas) via opening 121, conduit 124, and conduit 132. The opening of the collection vessel that is fluidically connected to the source of the gas can, in some embodiments, be the same opening as the opening of the collection vessel that is fluidically connected to the source of negative pressure. One such example of this arrangement is shown in FIGS. 1A-1B, in which both negative pressure source 122 and gas source 130 are fluidically connected to collection vessel 116 via opening 121. In such embodiments, opening 121 can be used as both an inlet into collection vessel 116 (e.g., when gas is transported from gas source 130 into collection vessel 116, for example, as described in more detail below) and an outlet from the collection vessel (e.g., when negative pressure source 122 is used to remove gas or other materials from collection vessel 116, for example, as described in more detail below). In other embodiments, the opening of the collection vessel that is fluidically connected to the source of the inert gas is different from the opening of the collection vessel that is fluidically connected to the source of negative pressure.

A variety of gases can be used in the systems and methods described herein. As noted above, the gas can be inert with respect to the molten metal within the reactor (and/or to other components), in some embodiments. In some embodiments, the inert gas comprises a noble gas. In some embodiments, the inert gas comprises helium, neon, argon, krypton, and/or xenon. In some embodiments, the use of helium, neon, argon, and/or krypton is advantageous. In certain embodiments, the use of argon is advantageous. It should be understood that other inert gases could also be used, and the selection of an appropriate inert gas will generally involve selecting a gas that does not chemically react with the molten metal or reacts with the molten metal only to a limited degree (e.g., to a degree sufficiently low to allow for the production of metal having the purities described elsewhere herein). Other gases that can be used include, but are not limited to nitrogen ($N_2$) and carbon dioxide. In some embodiments, the gas contains little or no oxygen. For example, in some embodiments, the gas (e.g., inert gas) has an oxygen content of less than or equal to 5 mol %, less than or equal to 2 mol %, less than or equal to 1 mol %, less than or equal to 0.1 mol %, less than or equal to 0.01 mol %, less than or equal to 0.001 mol %, less than or equal to 0.0001 mol %, less than or equal to 0.00001 mol %, less than or equal to 0.000001 mol %, less than or equal to 0.0000001 mol %, or less.

In some embodiments, the reactivity of the gas with the molten metal is sufficiently small that an amount of reaction product between the gas and the molten metal is less than 1 millimole/L (or less than 0.1 millimole/L, less than 0.01 millimole/L, or less) within the molten metal. In some embodiments, the reactivity of the gas with all components of the system is sufficiently small that an amount of reaction product between the gas and all system components is less than 1 millimole/L (or less than 0.1 millimole/L, less than 0.01 millimole/L, or less) within the molten metal.

In some embodiments, the system comprises a regulator (e.g., between the gas source and the collection vessel, such as in position 134 of FIGS. 1A-1B) that is configured to control the amount of gas supplied to the collection vessel. As one example, the regulator can be a pressure regulator configured to control the size of an opening within the regulator, thus controlling the amount of gas supplied by source 130 to collection vessel 116.

Figure 3A:
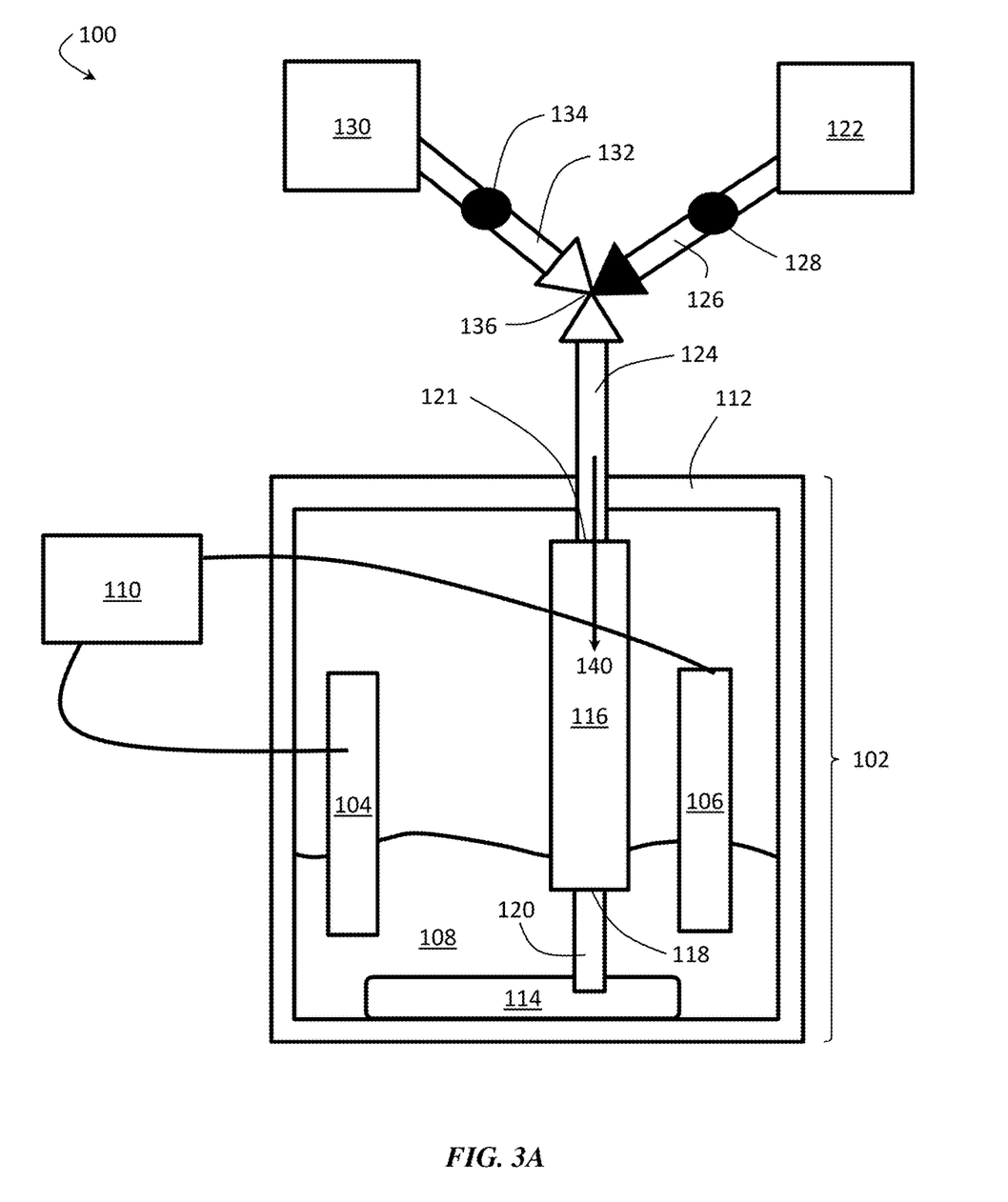
FIGS. 3A-3C are cross-sectional schematic illustrations of a system for producing and extracting molten metal, according to certain embodiments.
Figure 3B:
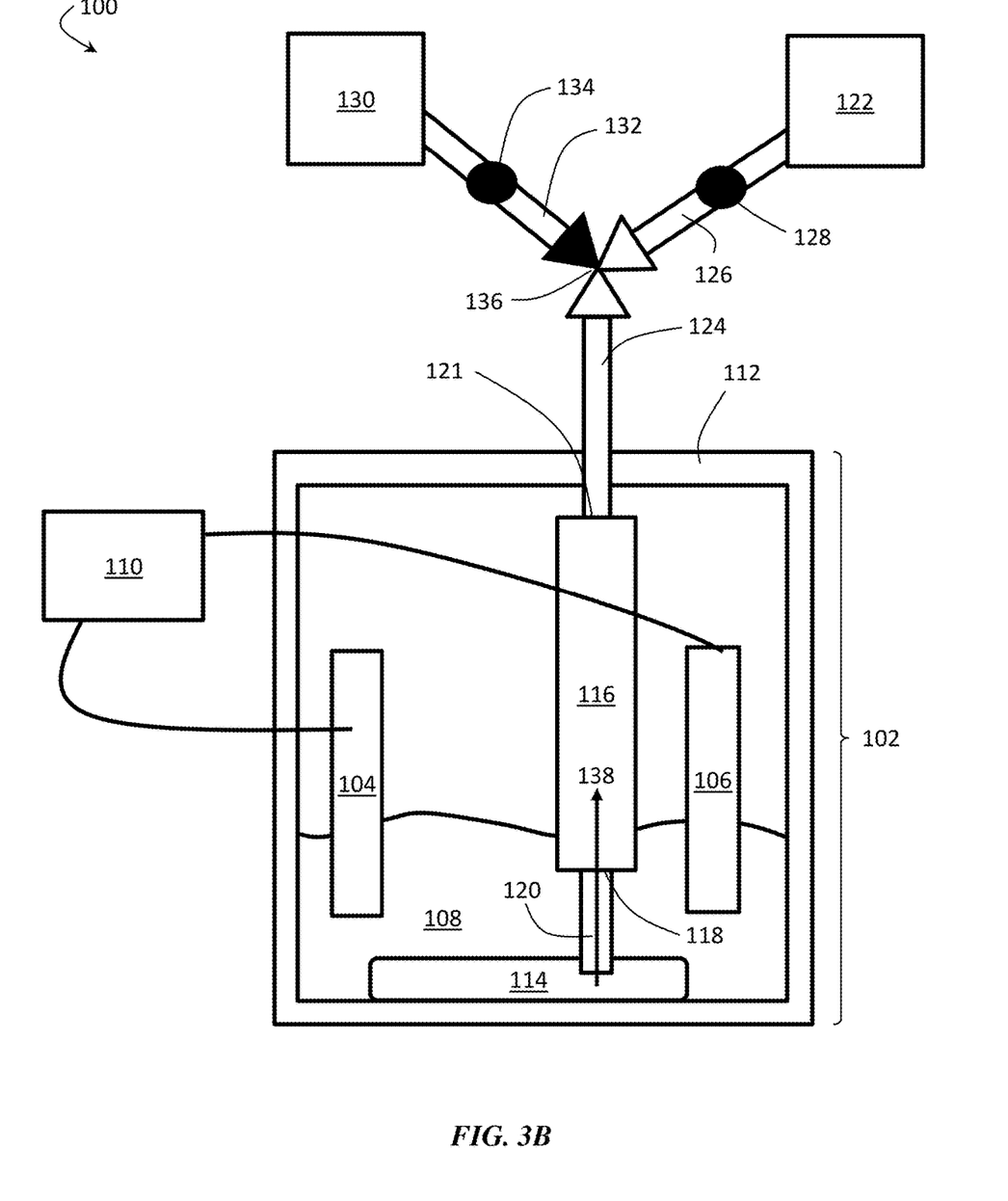

In certain embodiments, the system further comprises valving configured to (1) assume a first position in which an opening of the collection vessel is in fluidic communication with the source of gas while that opening of the collection vessel is not in fluidic communication with the source of negative pressure and (2) to assume a second position in which an opening of the collection vessel is in fluidic communication with the source of negative pressure while that opening of the collection vessel is not in fluidic communication with the source of gas. One example of such valving is shown in FIGS. 1A-1B and is further illustrated in FIGS. 3A-3B (as valving 136). In FIG. 3A, valving 136 comprises a single three-way valve that is in a first position in which opening 121 of collection vessel 116 is in fluidic communication with gas source 130 while opening 121 of collection vessel 116 is not in fluidic communication with negative pressure source 122. In FIG. 3B, valving 136 has been switched to a second position in which opening 121 of collection vessel 116 is in fluidic communication with negative pressure source 122 while opening 121 of collection vessel 116 is not in fluidic communication with gas source 130. While FIGS. 3A-3B illustrate valving 136 as a single three-way valve, other valving configurations could also be used. For example, in some embodiments, two two-way valves could be used in valving 136 (e.g., with each of the two-way valves fluidically connected to opening 121 of collection vessel 116, one of the two-way valves fluidically connected to negative pressure source 122, and the other of the two-way valves fluidically connected to gas source 130). In some embodiments, a four-way valve could be used. The fourth position of the four-way valve could be used, for example, to cut off fluidic communication between collection vessel 116 and both of negative pressure source 122 and gas source 130. Other configurations could also be used.

Conduit 120 and/or conduit 124 (and/or any other components that are positioned within the reactor and are used to provide a fluidic pathway between molten metal 114 and negative pressure source 122 and/or gas source 130) can be made of any of a variety of suitable materials. In some embodiments, conduit 120 and/or conduit 124 (and/or any other components that are positioned within the reactor and are used to provide a fluidic pathway between molten metal 114 and negative pressure source 122 and/or gas source 130) can be made of a material configured to withstand the high temperature environment of the container of certain reactors. For example, in some embodiments, refractory metal and/or a ceramic can be used. In some embodiments, tantalum, tungsten, titanium, molybdenum, high-grade iron, Hastelloy B, and/or Inconel can be used. In certain embodiments, the use of tantalum can be advantageous as it can provide a combination of weldability and high temperature resistance. In some embodiments in which the reactor is being used to process ferroalloys, the use of high-grade iron can be advantageous. In some embodiments, at least a portion (e.g., at least 50% of, at least 75% of, at least 90% of, at least 95% of, at least 99% of, or all) of the interior surface area of the walls of conduit 120 and/or conduit 124 (and/or any other components that are positioned within the reactor and are used to provide a fluidic pathway between molten metal 114 and negative pressure source 122 and/or gas source 130) is made of one or more of these materials.

The fluidic connectivity within the system can be, in certain embodiments, as follows. A conduit (e.g., conduit 120, which can be, for example, a siphon tube) can lead to the collection vessel, which can be connected to a second conduit (e.g., hard-lined tubing) that leads out of the reactor to a tee junction. At the tee junction, there can be a first pathway leading to the negative pressure source (optionally via a negative pressure regulator) and a second pathway leading to the gas source (optionally via a gas regulator).

Figure 4A:
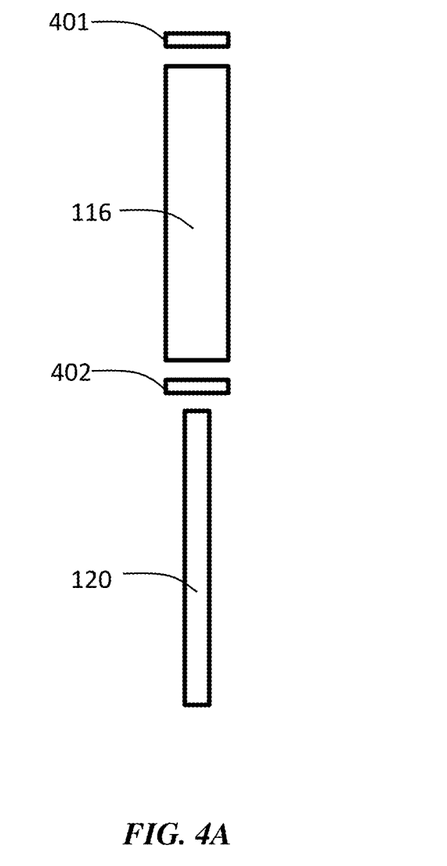
FIGS. 4A-4B are cross-sectional schematic illustrations showing the assembly of a collection vessel and conduit, in accordance with some embodiments.
Figure 4B:
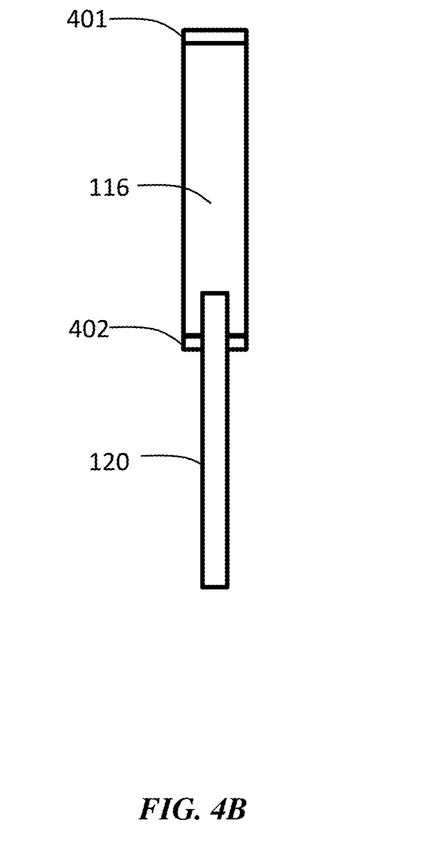

In certain embodiments, the collection vessel can be bound by two plates (e.g., cap disks). An example of this arrangement is shown in FIGS. 4A-4B. FIG. 4A is a cross-sectional schematic illustration of the components that can be assembled as shown in the cross-sectional illustration provided in FIG. 4B. In FIG. 4B, plate 401 has been welded to one side of collection vessel 116 and plate 402 has been welded to the second side of collection vessel 116. The welding can be performed such that a seal is formed between collection vessel 116 and plate 401 and such that a seal is formed between collection vessel 116 and plate 402. One suitable method of making such connections is TIG welding. Also as shown in FIG. 4B, conduit 120 (e.g., a siphon tube) has been inserted through an opening in plate 402 and welded to plate 402, creating a seal between the outside of conduit 120 and the inside of the opening in plate 402.

The collection vessel, the plates, and the conduit shown in FIGS. 4A-4B can be made of any of a variety of suitable materials. In some embodiments, materials configured to withstand the high temperature environment of the container of certain reactors can be used (e.g., refractory metal and/or ceramic). In some embodiments, tantalum, tungsten, titanium, molybdenum, high-grade iron, Hastelloy B, and/or Inconel can be used. In certain embodiments, the use of tantalum can be advantageous as it can provide a combination of weldability and high temperature resistance. In some embodiments in which the reactor is being used to process ferroalloys, the use of high-grade iron can be advantageous. In some embodiments, at least a portion (e.g., at least 50% of, at least 75% of, at least 90% of, at least 95% of, at least 99% of, or all) of the interior surface area of the collection vessel, the plates, and/or the conduit shown in FIG. 4B is made of one or more of these materials.

In some embodiments, at least a portion (e.g., at least 50% of, at least 75% of, at least 90% of, at least 95% of, at least 99% of, or all) of the collection vessel, the plate(s), and/or the conduit(s) described herein comprise a material(s) having limited or negligible solubility and/or reactivity with the second phase (e.g., electrolyte) and/or the molten metal contained within the reactor container. In some embodiments, the collection vessel, the plate(s), and/or the conduit(s) described herein may comprise a material(s) having limited or negligible solubility and/or reactivity (e.g., rate of corrosion or dissolution) when exposed to (e.g., in contact with) the second phase (e.g., electrolyte) and/or the molten metal contained within the reactor container. Referring to FIG. 1A as an example, the portion of collection vessel 160, plate(s) (not shown), and conduit 120 in contact with molten metal 114 and/or second phase 108 may have negligible solubility and/or reactivity in the molten metal and/or the second phase. Advantageously, by using a relatively non-reactive material to form part of the system (e.g., collection vessel, the plate(s), and/or the conduit(s)), the system may be exposed to the second phase (e.g., electrolyte) and/or the molten metal for a prolonged period of time without damaging the integrity of the system and/or generating undesirable contaminates that could compromise the purity of the molten metal. In some embodiments, the collection vessel, the plate(s), and/or the conduit(s) described herein may comprise a refractory metal described elsewhere herein (e.g., tantalum, tungsten, molybdenum, etc.). Other materials are also possible.

In some embodiments, the maximum rate of corrosion of the portion of the collection vessel, the plate(s), and/or the conduit(s) in contact with the molten metal and/or the second phase (e.g., electrolyte) within the container may be less than or equal to 5 g/(m$^2$·hr), less than or equal to 3 g/m²·hr, less than or equal to 2 g/(m²·hr), less than or equal to 1 g/(m²·hr), less than or equal to 0.5 g/(m²·hr), less than or equal to 0.3 g/(m²·hr), less than or equal to 0.2 g/(m²·hr), less than or equal to 0.1 g/(m²·hr), or less, and/or down to 0.2 g/(m²·hr), down to 0.1 g/(m²·hr), down to 0.01 g/(m²·hr), down to 0.001 (g/m²·hr), or down to 0.0001 (g/m²·hr). Combinations of the above-referenced ranges are possible (e.g., less than or equal to 3 g/(m²·hr) and down to 0.1 g/(m²·hr), or less than or equal to 3 g/(m²·hr) and down to 0.0001 g/(m²·hr)). Other ranges are also possible.

In some embodiments, the maximum solubility of the portion of the collection vessel, the plate(s), and/or the conduit(s) in contact with the molten metal and/or the second phase (e.g., electrolyte) within the container may be less than or equal to 0.5 at %, less than or equal to 0.25 at %, less than or equal to 0.2 at %, less than or equal to 0.1 at %, less than or equal to 0.05 at %, less than or equal to 0.01 at %, less than or equal to 0.005 at %, less than or equal to 0.0006 at %, less than or equal to 0.0005 at %, or less, and/or down to 0.005 at %, down to 0.001 at %, down to 0.0006 at %, down to 0.0005 at %, down to 0.0001 at %, down to 0.00001 at %, or less. Combinations of the above-referenced ranges are possible (e.g., less than or equal to 0.25 at % and down to 0.0005 at %, or less than or equal to 0.25 at % and down to 0.00001 at %,). Other ranges are also possible.

In embodiments in which the portion of the collection vessel, the plate(s), and/or the conduit(s) in contact with a molten metal (e.g., neodymium) comprises tungsten, the corrosion rate and/or solubility of the portion of the collection vessel, the plate(s), and/or the conduit(s) in contact with the molten metal within the container may have any of a variety of corrosion rates and/or solubilities described above, such as a maximum corrosion rate of less than or equal to 0.1 g/(m²·hr) and down to 0.0001 g/(m²·hr), and/or a maximum solubility of less than or equal to 0.0006 at % and down to 0.00001 at %. Other ranges are also possible.

In embodiments in which the portion of the collection vessel, the plate(s), and/or the conduit(s) in contact with a molten metal (e.g., neodymium) comprises tantalum, the corrosion rate and/or solubility of the portion of the collection vessel, the plate(s), and/or the conduit(s) in contact with the molten metal within the container may have any of a variety of corrosion rates and/or solubilities described above, such as a maximum corrosion rate of less than or equal to 0.2 g/(m²·hr) and down to 0.0001 g/(m²·hr) and/or a maximum solubility of less than or equal to 0.005 at % and down to 0.00001 at %. Other ranges are also possible.

In embodiments in which the portion of the collection vessel, the plate(s), and/or the conduit(s) in contact with a molten metal (e.g., neodymium) comprises molybdenum, the corrosion rate and/or solubility of the portion of the collection vessel, the plate(s), and/or the conduit(s) in contact with the molten metal within the container may have any of a variety of corrosion rates and/or solubilities described above, such as a maximum corrosion rate of less than or equal to 3 g/(m²·hr) and down to 0.0001 g/(m²·hr) and/or a maximum solubility of less than or equal to 0.25 at % and down to 0.00001 at %. Other ranges are also possible.

Generally, during operation, the components of system 100 that are fluidically connected from conduit 120, through collection vessel 116, and to each of the negative pressure source and the gas source will be sealed. As described above, a seal between collection vessel 116 and conduit 120 can be achieved via welding or any other suitable technique capable of joining the materials from which collection vessel 116 and conduit 120 are made. Similarly, a seal between collection vessel 116 and conduit 124 can be achieved via welding or any other suitable technique capable of joining the materials from which collection vessel 116 and conduit 124 are made. In some embodiments, the fluidic connections made outside the reactor can be made using off-the-shelf fluidic components (e.g., stainless steel tubing, ferrules, valves, and the like).

As noted above, in addition to inventive systems, inventive methods are also described herein. In some embodiments, the method comprises operating any of the systems described herein such that negative pressure is applied to the collection vessel (e.g., using the source of negative pressure) such that at least a portion of the molten metal (e.g., molten rare earth metal) within the container of the reactor enters the collection vessel. For example, in FIG. 3B, negative pressure source 122 can be used to apply negative pressure to collection vessel 116 (via conduit 126, valving 136, conduit 124, and opening 121) such that at least a portion of molten metal 114 enters collection vessel 116 in the direction of arrow 138. In certain embodiments, applying the negative pressure to the collection vessel results in a relatively large amount of the volume of the collection vessel being occupied by molten metal. For example, in some embodiments, applying the negative pressure to the collection vessel results in at least 25 vol %, at least 50 vol %, at least 75 vol %, at least 90 vol %, at least 95 vol %, at least 99 vol %, at least 99.9 vol %, at least 99.99 vol %, at least 99.999 vol %, or more (e.g., 100 vol %) of the volume of the collection vessel being occupied by molten metal. The molten metal can be transported into the collection vessel while the collection vessel is at least partially contained within the reactor, in accordance with certain embodiments.

Certain embodiments comprise, prior to applying the negative pressure to the collection vessel, transporting gas (e.g., from a source of gas, such as a source of inert gas) into the collection vessel. For example, in FIG. 3A, gas source 130 can be used to supply gas to collection vessel 116 (via conduit 132, valving 136, conduit 124, and opening 121, in the direction of a row 140) such that gas at least partially fills collection vessel 116. In some embodiments, transporting the gas into the collection vessel results in at least 75 vol %, at least 90 vol %, at least 95 vol %, at least 99 vol %, at least 99.9 vol %, at least 99.99 vol %, at least 99.999 vol %, or more (e.g., 100 vol %) of the volume of the collection vessel being occupied by gas (e.g., inert gas). Certain embodiments comprise transporting at least one noble gas (e.g., argon) into the collection vessel such that at least 75 vol %, at least 90 vol %, at least 95 vol %, at least 99 vol %, at least 99.9 vol %, at least 99.99 vol %, at least 99.999 vol %, or more (e.g., 100 vol %) of the volume of the collection vessel is occupied by one or more noble gases (e.g., argon).

In some embodiments, after the gas has been transported into the collection vessel, and after the negative pressure has been applied to the collection vessel, a relatively high percentage of the volume of the collection vessel is occupied by metal or gas. For example, in some embodiments, after the gas has been transported into the collection vessel, and after the negative pressure has been applied to the collection vessel such that molten metal enters the collection vessel, at least 90 vol %, at least 95 vol %, at least 99 vol %, at least 99.9 vol %, at least 99.99 vol %, at least 99.999 vol %, or more (e.g., 100 vol %) of the volume of the collection vessel is occupied by gas (e.g., inert gas) or metal (e.g., molten metal from the reactor). By minimizing the presence of material that is not the metal and that is not non-reactive gas, one can minimize the degree to which the metal reacts (e.g., with oxygen or other reactants), which can lead to the production of relatively pure metal product(s).

Figure 3C:
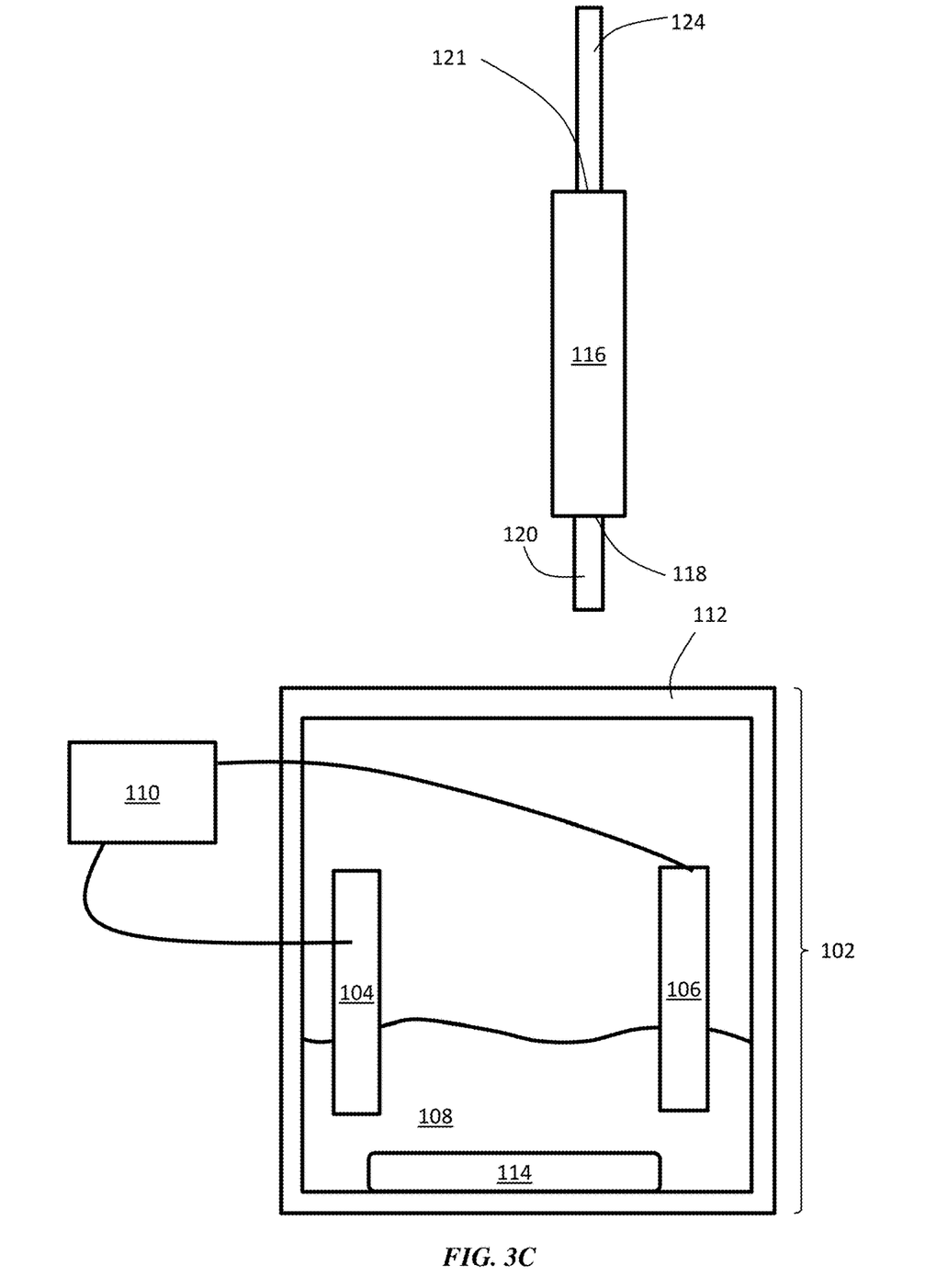

In certain embodiments, the method further comprises, after at least the portion of molten metal enters the collection vessel, removing the collection vessel from the reactor. For example, in FIG. 3C, collection vessel 116, which contains at least a portion of the molten metal 114, has been removed from reactor 102. While collection vessel 116 is illustrated in FIG. 3C as being detached from valving 136, conduit 132, gas source 130, conduit 126, and negative pressure source 122, in other embodiments, one or more of these components can remain attached to collection vessel as and/or after it is removed from the reactor. In certain embodiments, a relatively large amount of the volume of the collection vessel is occupied by molten metal and/or metal that has solidified from the molten metal as the collection vessel is removed from the reactor. For example, in some embodiments, at least 25 vol %, at least 50 vol %, at least 75 vol %, at least 90 vol %, at least 95 vol %, at least 99 vol %, at least 99.9 vol %, at least 99.99 vol %, at least 99.999 vol %, or more (e.g., 100 vol %) of the volume of the collection vessel is occupied by molten metal and/or metal that has solidified from the molten metal as the collection vessel is removed from the reactor. In some embodiments, at least 25 vol %, at least 50 vol %, at least 75 vol %, at least 90 vol %, at least 95 vol %, at least 99 vol %, at least 99.9 vol %, at least 99.99 vol %, at least 99.999 vol %, or more (e.g., 100 vol %) of the volume of the collection vessel is occupied by molten metal as the collection vessel is removed from the reactor.

In certain embodiments, the method further comprises allowing the molten metal to solidify within the collection vessel after the collection vessel has been removed from the reactor.

In certain embodiments, the systems and methods described herein can be used to produce a final product with a relatively high purity of metal. For example, in some embodiments, after the collection vessel has been removed from the reactor and the contents of the collection vessel have been solidified, the solidified material contains metal in an amount of at least 90 at %, at least 95 at %, at least 99 at %, at least 99.9 at %, at least 99.99 at %, at least 99.999 at %, or at least 99.9999 at % (up to 100 at %). In certain embodiments, after the collection vessel has been removed from the reactor and the contents of the collection vessel have been solidified, the solidified material can contain one or more rare earth metals in an amount of at least 90 at %, at least 95 at %, at least 99 at %, at least 99.9 at %, at least 99.99 at %, at least 99.999 at %, or at least 99.9999 at % (up to 100 at %). In some embodiments, after the collection vessel has been removed from the reactor and the contents of the collection vessel have been solidified, the solidified material can contain oxygen in an amount of less than or equal to 2 at %, less than or equal to 1 at %, less than or equal to 0.5 at %, less than or equal to 0.1 at %, less than or equal to 0.05 at %, less than or equal to 0.01 at %, less than or equal to 0.005 at %, less than or equal to 0.001 at %, less than or equal to 0.0005 at %, less than or equal to 0.0001 at %, or less.

One example of a mode of operating the system to produce and collect liquid metal is as follows.

The reactor can be run to produce liquid metal (e.g., liquid rare earth metal) from an initial reactant. Once vacuum regulator (e.g., at position 128 in FIGS. 1A-1B) has been calibrated, conduit 126, valving 136, conduit 124, collection vessel 116 and, optionally, conduit 120 can be purged with gas (e.g., argon gas) from gas source 130. This fluidic pathway can then be sealed to retain the gas within collection vessel 116. Subsequently, conduit 120 and collection vessel 116 can be placed into the reactor such that opening 118 of collection vessel 116 is fluidically connected to molten metal 114. Under typical operation, the collection vessel will be lowered slowly into the reactor. Once fluidic connectivity has been established between the molten metal and the collection vessel, the negative pressure (e.g., vacuum) can be engaged. In some embodiments, the vacuum regulator will include preset settings such that, based on the metal being extracted from the reactor, the technician will not need to make manual adjustments. In some embodiments, the control system will engage as follows: the negative pressure source will run for a specified amount of time with a specified negative pressure applied to the material; once the negative pressure is shut off, a pre-measured amount of pressurized gas will be introduced into the collection vessel and connected conduits to fill the vacuum void; and the collection vessel will be slowly removed from the reactor while purging conduit 120 with gas (via flow of gas into an opening within plate 401) at a calculated rate to minimize bubbling within the second phase (e.g., molten electrolyte). In some embodiments, after the collection vessel has been fully removed from the reactor, the collection vessel will continue to be purged with gas or sealed until placed into a fully inert environment. Once in the fully inert environment, the collection vessel can be reheated, and the collected metal can be recast into its final form.

In some embodiments, during operation of the system(s) described above, a negative pressure is maintained within the system, such as within the collection vessel and associated conduits and the reactor container. Advantageously, maintaining a negative pressure throughout the system may lead to a more efficient overall process, reduce or eliminate the presence of trace reactive gas (e.g., oxygen) introduced with the inert gas, reduce or eliminate the degree to which the metal reacts (e.g., with oxygen or other reactants), and/or lead to the production of relatively pure metal product(s). Such a process is described in more detail below.

In some embodiments, a negative pressure may be applied to the collection vessel and associated conduits before the collection vessel and associated conduits are placed into the reactor container. For example, according to some embodiments, the collection vessel and associated conduit is placed under a vacuum of 30 inHg or less, 25 inHg or less, 20 inHg or less, 15 inHg or less. For example, as shown in FIG. 4B, the interior of collection vessel 116 and associated conduit 120 may be first purged with an inert gas supplied by an inert gas source (e.g., inert gas source 130 shown in FIG. 3A). During the purging step, a bottom port of conduit 120 may be opened, after which an inert gas is flowed into through collection vessel 116 and conduit 120, and after which the bottom port of the conduit 120 is closed at the end of the purging process, according to some embodiments. A negative pressure (from a negative pressure source such as source 122 shown in FIG. 3A) may be subsequently applied to collection vessel 110 and conduit 120 to place the collection vessel and conduit under vacuum, according to some embodiments.

In some embodiments, prior to introducing the collection vessel and associated components into the reactor (e.g., electrolytic cell), a negative pressure may be applied to the reactor (e.g., reactor 102 shown in FIG. 3A) such that the interior of the reactor container is placed under a vacuum of at least 1 inch, at least 2 inches, at least 3 inches, or more, and/or up 5 inches, or more, of water column.

In some embodiments, the collection vessel and associated conduits may be placed into the reactor container and immersed in the second phase (e.g., electrolyte), with both the reactor container and the collection vessel and associated conduits being kept under vacuum. The bottom of the conduit, according to some embodiments, is in contact with (e.g., immersed in) the molten metal in the reactor container. For example, as shown in FIG. 3A, collection vessel 116 and associated conduit 120 may be placed into reactor container 112 and immersed in second phase 108, with the bottom of the conduit 120 in contact with (e.g., immersed in) molten metal 114. The collection vessel and/or conduit may be immersed in the second phase (e.g., electrolyte) and/or molten metal for any appropriate period of time to allow the system to reach thermal equilibrium, such as at least 2 minutes, at least 5 minutes, and/or up to 8 minutes, up to 10 minutes or more. According to some embodiments, after reaching thermal equilibrium, the bottom of the conduit (e.g., conduit 120 shown in FIG. 3A) may be opened and a negative pressure may be applied from a negative pressure source (e.g., negative pressure source 122 shown in FIG. 3A). Under the applied negative pressure, the molten metal may migrate into the conduit and the collection vessel, as described elsewhere herein. Once the molten metal has been collected, the bottom port of the conduit (e.g., conduit 120 shown in FIG. 3A) may be closed and the conduit may be removed from the system. The reactor (e.g., reactor 102) may be then sealed and additional rounds of reactions (e.g., electrolytic reduction reactions) may be carried out within the reactor. It should be noted that any appropriate types of metallothermic reduction reactions may be carried out using the systems (e.g., system 100 shown in FIG. 1A) described herein, not limited to electrolytic reduction reaction.

U.S. Provisional Patent Application No. 63/334,371, filed Apr. 25, 2022, and entitled "Systems and Methods for Recovery of Molten Metal," is incorporated herein by reference in its entirety for all purposes.

The following examples are intended to illustrate certain embodiments of the present invention, but do not exemplify the full scope of the invention.

Example 1

A dense saturated solution of 500 mL distilled water and sodium chloride was made. After mixing and saturation, a syphon apparatus made of polycarbonate and HDPE (0.75" ID of the outer tube with a length of 12 inches and 0.25" OD of the inner tube with a length of 8 inches) was inserted into the solution. The syphon was hooked up to a vacuum with a needle valve as a regulator for the suction. Approximately 4 psi of vacuum was pulled on the syphon, and the water solution began to be suctioned into the syphon. After collecting approximately 30 mL of solution, the vacuum suction was eliminated, and the syphon was removed. The syphon was tilted upside down and the saturated solution was collected in a beaker. No saturated solution remained in the syphon.

Example 2

A liquid eutectic of bismuth, indium, tin (Roto174F) was melted, and 100 mL of the eutectic were cast into a beaker. After reheating the beaker over a hot plate, a syphon apparatus made of polycarbonate and HDPE (0.75" ID of the outer tube with a length of 12 inches and 0.25" OD of the inner tube with a length of 8 inches) was inserted into the liquid metal. The syphon was hooked up to a vacuum with a needle valve as a regulator for the suction. Approximately 7 psi of vacuum was pulled on the syphon, and the liquid metal began to be suctioned into the syphon. After collecting approximately 20 mL of liquid metal, the vacuum suction was eliminated, and the syphon was removed.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system, comprising:
a reactor; and
a collection vessel comprising:
a first opening fluidically connected to the reactor, and
a second opening fluidically connected to a source of gas and to a source of negative pressure,
wherein the collection vessel is in fluidic communication with a bottom half of an interior volume of the reactor.

2. A system, comprising:
a reactor; and
a collection vessel;
wherein the collection vessel is fluidically connected to the reactor, a source of gas, and a source of negative pressure, and
wherein the collection vessel is in fluidic communication with a bottom half of an interior volume of the reactor.

3. The system of claim 2, wherein the source of the negative pressure is a vacuum pump.

4. The system of claim 2, wherein the reactor is a reduction cell.

5. The system of claim 4, wherein the reduction cell is an electrolytic cell.

6. The system of claim 5, wherein the electrolytic cell comprises an anode, a cathode, and an electrolyte.

7. The system of claim 2, wherein the reactor comprises a molten metal within a container.

8. The system of claim 7, wherein the molten metal comprises a molten rare earth metal.

9. The system of claim 7, wherein the container is thermally insulated.

10. The system of claim 7, wherein a spatially averaged temperature within the container is at least 675° C.

11. The system of claim 2, wherein the collection vessel has a volume of at least 180 $cm^3$.

12. The system of claim 2, wherein walls of the collection vessel comprise a refractory metal and/or a ceramic.

13. The system of claim 2, wherein the source of gas is a source of inert gas.

14. The system of claim 13, wherein the inert gas comprises a noble gas.

15. The system of claim 2, further comprising valving, wherein:
the valving is positioned between the source of gas and the collection vessel;
the valving is positioned between the source of negative pressure and the collection vessel,
the valving is configured to assume a first position in which the collection vessel is in fluidic communication with the source of gas but not in fluidic communication with the source of negative pressure, and
the valving is configured to assume a second position in which the collection vessel is in fluidic communication with the source of negative pressure but not in fluidic communication with the source of gas.

16. The system of claim 7, wherein the molten metal forms a first liquid phase, wherein the reactor is an electrolytic cell, wherein a second liquid phase is present in the reactor, wherein the second liquid phase comprises a molten salt electrolyte, and wherein the molten metal comprises a molten rare earth metal.

17. The system of claim 1, wherein the source of the negative pressure is a vacuum pump.

18. The system of claim 1, wherein the reactor is a reduction cell.

19. The system of claim 18, wherein the reduction cell is an electrolytic cell.

20. The system of claim 19, wherein the electrolytic cell comprises an anode, a cathode, and an electrolyte.

21. The system of claim 1, wherein the reactor comprises a molten metal within a container.

22. The system of claim 21, wherein the molten metal comprises a molten rare earth metal.

23. The system of claim 21, wherein the container is thermally insulated.

24. The system of claim 21, wherein a spatially averaged temperature within the container is at least 675° C.

25. The system of claim 1, wherein the collection vessel has a volume of at least 180 $cm^3$.

26. The system of claim 1, wherein walls of the collection vessel comprise a refractory metal and/or a ceramic.

27. The system of claim 1, wherein the source of gas is a source of inert gas.

28. The system of claim 27, wherein the inert gas comprises a noble gas.

29. The system of claim 1, further comprising valving, wherein:
- the valving is positioned between the source of gas and the second opening;
- the valving is positioned between the source of negative pressure and the second opening,
- the valving is configured to assume a first position in which the second opening is in fluidic communication with the source of gas but not in fluidic communication with the source of negative pressure, and
- the valving is configured to assume a second position in which the second opening is in fluidic communication with the source of negative pressure but not in fluidic communication with the source of gas.

30. The system of claim 21, wherein the molten metal forms a first liquid phase, wherein the reactor is an electrolytic cell, wherein a second liquid phase is present in the reactor, wherein the second liquid phase comprises a molten salt electrolyte, and wherein the molten metal comprises a molten rare earth metal.

\* \* \* \* \*